May 19, 1959  L. G. JOHNSON  2,887,331
CLOSURE
Filed Oct. 10, 1956

INVENTOR:
LANGDON G. JOHNSON
BY Edward H. Goodrich
HIS ATTORNEY.

United States Patent Office 2,887,331
Patented May 19, 1959

2,887,331

CLOSURE

Langdon G. Johnson, Bristol, Conn., assignor to General Motors Corporation, Detroit, Mich., a corporation of Delaware Application October 10, 1956, Serial No. 615,104

5 Claims. (Cl. 286—5)

The present invention relates to a shield or seal for closing the annular space between a pair of relatively rotatable members and particularly to an improved multi-lipped closure for sealing the end of a bearing.

It is an object of the present invention to provide an improved closure and preferably a demountable seal that is particularly adapted for use in a bearing which is operated under conditions wherein there is a prevalance of dust, dirt, water and/or other deleterious conditions.

It is a further object to provide an improved closure or seal having a resilient lip construction and which is not detrimentally affected by light, heat or lubricants.

My deformable closure member includes a pair of concentrically disposed resilient annular portions, the outer of which has a reinforcing element embedded therein resulting in the inner annular portion being relatively more deformable than the reinforced outer portion. It is preferred to secure a plurality of such closure members together thus providing a coaxial stack in which the reinforced portions of the members are in abutting relation and the non-reinforced or flexible sealing lips are axially spaced from each other to retain lubricant within an annular lubricant chamber and to prevent the entrance of dirt and moisture into the lubricant chamber.

To these ends and also to improve generally upon devices of this character, this invention consists in the various matters hereinafter described and claimed. In its broader aspects, the invention is not necessarily limited to the specific arrangements selected for illustration in the accompanying drawings wherein:

Figure 1:
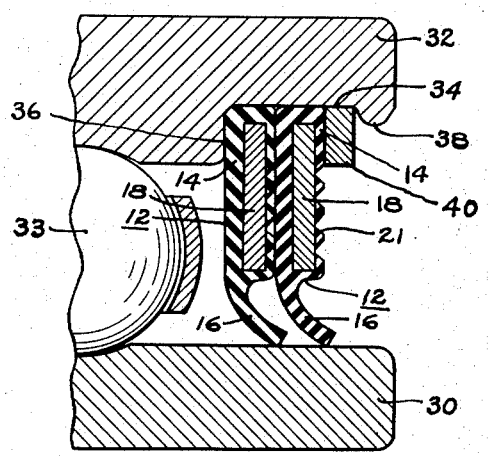
Figure 1 is a fragmentary cross section of an antifriction bearing equipped with one form of my invention.

My closure member as 12, which may be formed by a molding operation under heat and pressure, is preferably composed of a suitable deformably resilient rubber-like material that will not be injuriously affected by heat, light or lubricants. Suitable materials include synthetic rubber, polymeric amides, commonly referred to as "nylon," and polymerized tetrafluorethylene frequently called "Teflon." The closure member 12 includes an outer annular portion 14 generally rectangular in cross section and a disc-like inner portion 16. The outer portion 14 is normally made of a thicker cross section than is the disc-portion 16. A reinforcing ring 18, embedded in and preferably bonded to the outer portion 14, is axially offset from the inner portion 16 as shown. With this construction, the inner concentric portion 16, which serves as a sealing lip, is more resiliently deformable than is the outer reinforced portion 14.

To insure that the reinforcing ring 18 is properly located within the annular portion 14, a mold is used during the formation of the closure which has a plurality of annular teeth or ribs that project axially and accurately space the reinforcing ring from the generally radial closure member faces 19 and 20. The molding operation results in one face of the portion 14 having a plurality of recesses or corrugations 21 formed therein and which are uniformly disposed about the axis of the annular closure member 12. By thus forming the closure with an accurately positioned reinforcing ring, a structure results in which the bottom of the recesses 21 are substantially coplanar with an adjacent face 22 of the reinforcing ring.

This procedure of accurately locating the reinforcing rings 18 during the molding operation, avoids the tendency of the reinforcing rings to float within the outer portions 14 and to improperly and unevenly locate within the members 12. It has been found particularly in my stacked or multi-lip type closure or seal, that it is important for the reinforcing members 18 to be accurately positioned with respect to the faces and periphery of the closure.

Figures 2, 5:
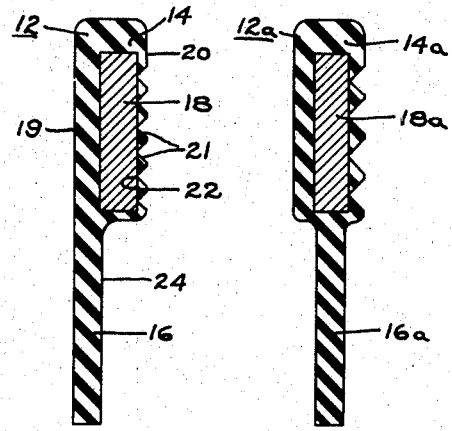
Figure 2 is an enlarged view of one of my closure members.
Figure 5 is a modified form of one of my closure members.

In the structure of Figure 2, the inner and outer portions 14 and 16 have the common radial side face 19 and a side face 24 of the disc-portion 16 is in stepped relation to the side face 20 of the annular portion 14.

A modified structure shown in Figure 5 provides a closure 12a similar to that of Figure 2, except that a disc-portion 16a is generally central of and coaxial of an outer annular portion 14a wherein a reinforcing ring 18a is embedded in a similar manner to that of the ring 18 in Figure 2.

Figure 3:
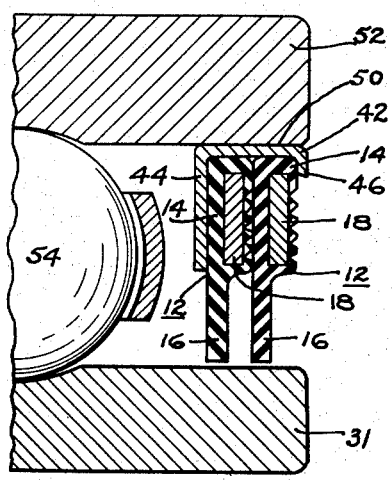
Figure 3 is a fragmentary cross section showing another form of my closure installed in the end of an antifriction bearing.
Figure 4:
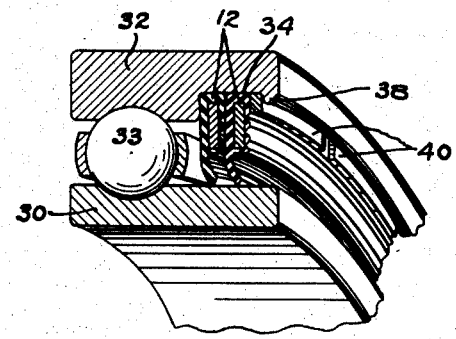
Figure 4 is a fragmentary perspective view of the seal arrangement of Figure 1.

It is preferred that the above-described closure members be combined in coaxial stacks such as shown in Figures 1, 3 and 4 to provide multi-lip closures or seals. Figure 1 shows a seal stack of two or more closure members in which the flexible lips 16 are in deformably resilient wiping engagement with the rotatable inner race ring 30 of an antifriction bearing.

In Figure 3, the lips 16 are disposed in close proximity to an inner race ring 31 but not in actual wiping contact therewith.

Referring to Figure 1, an outer race 32 is in relatively rotatable relation to the inner race ring through a circumferential series of rolling elements, as balls 33, and has an annular seal-receiving groove 34 opening towards the inner race ring 30. This groove is located between a substantially radial shoulder 36 and a transversely arcuate annular land 38. Depending on the environment in which the bearing is to be used, the groove 34 may be of suitable axial extent to contain the appropriate number of individual closure members 12 or 12a necessary to keep lubricant in the bearing and maintain the bearing elements free from dirt. A plurality of the closure members 12 or 12a are deformably snapped past the land 38 into the groove 34 and thereafter demountably clamped in place by a suitable snap ring 40 which is wedged between the outermost closure and the land 38. The closures peripherally seat in the groove 34 and the innermost closure wall seats against the shoulder 36 while the closures are maintained in axially abutting relation.

In the closure stack arrangement of Figure 3, a plurality of closure members, as 12 or 12a, are mounted within an annular retaining ring 42 which may be of sheet metal and includes a relatively deep inner end wall 44 and a relatively short outer end wall 46 in spaced relation. The ring 42 is peripherally and demountably pressed within the cylindrical inner bore 50 of an outer race ring 52 in rotatable relation to the inner race ring 31 through a circumferential row of intervening rolling elements 54.

I claim:

1. In a closure for demountable positioning across an annular lubricant chamber between a pair of spaced coaxial annular surfaces respectively located on a pair of relatively rotatable members, a plurality of deformably resilient closure discs in coaxial stacked relation, each disc having an enlarged peripheral portion which is substantially rectangular in cross section, a flat reinforcing ring embedded in each enlarged portion, a holder securing the enlarged disc portions in stacked unit-handling relation and mounted against one of the annular surfaces, each disc having a thin annular lip portion extending generally radially from an enlarged disc portion and having a side face coextensive with a side face of the enlarged portion, and said lip portions extending in laterally spaced relation to each other across the lubricant chamber into sealing relation with said other annular surface.

2. A demountable closure member comprising an integrally formed inherently resilient annular member, said member having an annular body portion substantially rectangular in cross section, a disc-shaped resiliently flexible portion radially extending from the body portion, said disc-shaped portion being narrower than the body portion and having a side face coextensive with a side face of said body portion, and a radially disposed reinforcing disc embedded in the body portion and laterally offset from the general plane of said disc-shape resilient portion.

3. A demountable closure member comprising a molded inherently resilient annular member, said member having an annular outer body portion substantially rectangular in cross section, an inner annular portion integral with said outer body portion and extending radially inwardly therefrom, the inner annular portion being resiliently flexible and narrower than said outer portion, the inner and outer portions having a common planar side face, and a flat reinforcing disc embedded in said body portion and laterally offset with respect to the general plane of said inner annular portion.

4. A demountable closure member comprising a resiliently deformable annular member having a pair of integral concentric annular portions, a reinforcing ring embedded within one of the annular portions, the other annular portion being narrower than and radially extending from the reinforced portion, and one side of the reinforced portion having a plurality of annular recesses concentric with the closure member, the bottoms of said recesses being substantially coplanar with an adjacent face of the reinforcing ring.

5. A demountable closure member comprising a molded resiliently deformable annular member, said member including an annular body portion substantially rectangular in cross section, a resiliently flexible disc-portion narrower than and extending radially inwardly from the body portion, said disc-portion being in stepped relation to one side face of the body portion, a reinforcing disc embedded in the body portion and having a side face adjacent to said face of the body portion, and said side face of the body portion having a plurality of spaced recesses formed therein and extending to the reinforcing disc.

References Cited in the file of this patent

UNITED STATES PATENTS

| | | |
|---|---|---|
| 2,049,366 | Gardner | July 28, 1936 |
| 2,275,325 | Searles | Mar. 3, 1942 |
| 2,468,247 | Victor | Apr. 26, 1949 |
| 2,486,928 | Cole | Nov. 1, 1949 |